United States Patent
Schoen et al.

(10) Patent No.: US 8,062,530 B2
(45) Date of Patent: Nov. 22, 2011

(54) METHOD FOR TREATMENT OF HIGH PH/SILICA BRINES

(75) Inventors: Richard M. Schoen, Hartland, WI (US); Chandrakant Tiwari, Oconomowoc, WI (US)

(73) Assignee: Aquatech International Corporation, Canonsburg, PA (US)

( * ) Notice: Subject to any disclaimer, the term of this patent is extended or adjusted under 35 U.S.C. 154(b) by 512 days.

(21) Appl. No.: 12/167,481

(22) Filed: Jul. 3, 2008

(65) Prior Publication Data

US 2009/0008334 A1    Jan. 8, 2009

Related U.S. Application Data

(60) Provisional application No. 60/958,308, filed on Jul. 3, 2007.

(51) Int. Cl.
    *C02F 1/60* (2006.01)
(52) U.S. Cl. ........ 210/710; 210/712; 210/713; 210/714; 210/724; 210/737
(58) Field of Classification Search .................... 210/714
    See application file for complete search history.

(56) References Cited

U.S. PATENT DOCUMENTS

| | | | |
|---|---|---|---|
| 2,963,355 A | 12/1960 | Dille et al. | |
| 4,016,075 A | 4/1977 | Wilkins | |
| 4,304,666 A | 12/1981 | Van Note | |
| 4,370,858 A | 2/1983 | Awerbuch et al. | |
| 4,428,200 A | 1/1984 | McCabe et al. | |
| 4,437,995 A | 3/1984 | Rex | |
| 4,765,913 A | 8/1988 | Featherstone | |
| 5,453,206 A | 9/1995 | Browne | |
| 5,904,853 A | 5/1999 | Allen et al. | |
| 6,312,601 B1 | 11/2001 | Allen et al. | |
| 6,627,085 B2 | 9/2003 | Burrows et al. | |
| 7,438,129 B2 * | 10/2008 | Heins | 166/266 |
| 7,681,643 B2 * | 3/2010 | Heins | 166/266 |

* cited by examiner

*Primary Examiner* — Peter A Hruskoci
(74) *Attorney, Agent, or Firm* — Buchanan Ingersoll & Rooney PC

(57) ABSTRACT

A method for neutralizing brines that contain high levels of silica accompanied with a high pH. Brine is processed through a reactor in which the pH is lowered and the resultant silica precipitate is adsorbed onto a sacrificial crystal structure. The resultant stream is then processed through a solids removal zone wherein the solids are removed and recovered for reuse. The neutralized solids-free brine is then suitable for down-hole injection in the heavy oil industry or further treatment by common water treatment methods if further adjustment is required for other industries.

16 Claims, 2 Drawing Sheets

Figure 1

METHOD FOR TREATMENT OF HIGH PH/SILICA BRINES

CLAIM TO PRIORITY

This application claims priority to U.S. Provisional Patent Application No. 60/958,308, filed on Jul. 3, 2007. That application is incorporated by reference as if fully rewritten herein.

FIELD OF THE INVENTION

The present invention relates to the disposal of brines that cannot be directly injected into a deep well and also present difficulty in standard treatment processes that attempt to make them suitable for disposal. It is especially related to brine streams currently being generated in steam assisted gravity drainage (SAGD) applications such as in the heavy oil industry but also for other brines with the same characteristics.

BACKGROUND OF THE INVENTION

The SAGD process generates a large quantity of produced water that is typified by low hardness and high silica ($SiO_2$) content. The SAGD process uses steam injected into the oil formation to lower the viscosity of the oil and allow it to flow to a collection wellhead. The oil is then separated from the condensed steam and the resultant produced water has to be processed, either as a waste stream or reused. Due to environmental restrictions and the high cost of replacing the produced water with existing water supplies in order to generate more steam, reuse is the preferred method.

There are two processes that are currently being used for reuse of the produced water. The standard method uses a once through steam generator (OTSG) to process the produced water and generate steam for injection. The newer method of reuse utilizes high-pressure packaged boilers for steam generation, which provide a greater recovery of water for steam injection. However, the packaged boilers need a high quality feedwater that does not have any measurable silica in it. Various methods are used to provide the high quality water the boilers require including Reverse Osmosis operating at high pH and evaporation technology.

Both of these pretreatment processes for packaged boilers require a high pH feedwater to maintain silica solubility and therein lays the problem that this invention addresses; both methods generate a blowdown stream that is at a high pH and can contain silica levels up to and exceeding five thousand (5000) parts per million (PPM). The blowdown stream cannot be injected into a deep well as the connate water is at a neutral pH and when the high pH/silica blowdown is injected into it, the lowering of the pH results in silica precipitation and plugging of the formation. Standard water treatment processes have been applied to this problem by the oil companies and other vendors, none of which have produced any consistently positive results.

One blowdown treatment option that has been investigated with relatively good results is the incorporation of the ZLD (Zero Liquid Discharge) concept. This method generally utilizes a crystallizing evaporator following a standard mechanical vapor compression evaporator, which is used for the production of high quality distillate for the packaged boilers. The standard method for treatment of the crystallizing evaporator blowdown is to send the generated solids to a mechanical dewatering device such as a filter press. However, the dewatering step usually does not work satisfactorily due to the buildup of any oil that has not been removed in the initial oil separation stage. In addition, the presence of Total Organic Carbon (TOC) in the produced water feed impacts the formation of crystals in the crystallizer and when coupled with the oil problems, causes plugging of the filter press and a resultant liquid stream that needs disposal. The use of high dosages of antiscalants in the first evaporator have also led to an inhibition of true form crystals in the crystallizer and the formation of small hard to filter particles. Systems have been modified to replace the mechanical dewatering equipment with a rotary drum dryer which works well but has a high capital and operating expense.

Another option that has been considered is acidification followed by lagoon settling with the addition of coagulants/flocculants. Typically, two (2) lagoons are used, one which is being filled while the second is drying out for solids removal. The supernatant from the filling lagoon is then filtered to remove colloidal particles and deep well injected. The land area and the cold climate of Canada has limited use of this option.

Another option has been considered in which the produced water feed to the evaporator section is acidified and fed into a preferential deposition seeded slurry of calcium sulfate ($CaSO_4$) which is circulated in the evaporator. This technique utilizes the precipitation of $CaSO_4$ to adsorb silica as it reaches its precipitation point. The technique works well in waters that contain sufficient calcium and sulfate ions to initiate precipitation. The precipitated solids are then removed with standard mechanical dewatering equipment and the filtrate is suitable deep well injection. However, the SAGD waters are typified by a minimal amount of both calcium and sulfate. These missing ions have to be injected into the produced water via the use of calcium chloride ($CaCL_2$) and sodium sulfate ($Na_2SO_4$). The cost of chemicals becomes prohibitive when the produced water silica content is upwards of 200 ppm, with a flow rate amounting to thousands of gallons per minute, and a precipitating ratio of $CaSO_4$ to $SiO_2$ of 5:1 required.

The fourth option to be considered is a high pH evaporator followed by acidification and mechanical dewatering of the solids. This method has high potential but has been plagued by light colloidal silica particles in the rapid agitation reaction vessel that are hard to flocculate and filter without the use of clarifiers, thickeners, and heavy doses of coagulants/flocculants. The precipitated solids exiting the mechanical dewatering device typically end up as a cake comprising 60% dry solids and 40% brine with dissolved salts. Since the brine portion also needs to be land filled, the cost of disposal rises incrementally.

SUMMARY OF THE INVENTION

Provided herein are methods for neutralizing brines that contain high levels of silica accompanied with a high pH. Brine is processed through a reactor in which the pH is lowered and the resultant silica precipitate is adsorbed onto a sacrificial crystal structure. The resultant stream is then processed through a solids removal zone wherein the solids are removed and recovered for reuse. The neutralized solids-free brine is then suitable for down-hole injection in the heavy oil industry or further treatment by common water treatment methods if further adjustment is required for other industries.

Processes described herein may have one or more of the following advantages over current practice:
1. The neutralized stream with silica lowered to acceptable levels can be injected into connate waters with little or no fear of formation plugging.

2. The solids generated during the process can be easily and effectively de-watered and removed with conventional treatment processes.
3. The solid wastes generated can be land filled into receivers with non-hazardous ratings.
4. The technique utilized is more cost effective than current attempts being used for neutralization.
5. The use of antiscalants and dispersants, TOC, and nominal oil foulants from upstream processes has no effect on the polymerization and adsorption process.

DETAILED DESCRIPTION

Produced waters utilized for production of steam additionally include the presence of silicon dioxide (also known as silica or $SiO_2$) in one form or another, depending upon pH and the other species present in the water. For evaporator systems, scaling of the heat transfer surface with silica is to be avoided. This is because (a) silica forms a relatively hard scale that reduces productivity of the evaporator, (b) scale is usually rather difficult to remove, (c) the scale removal process produces undesirable quantities of spent cleaning chemicals, and (d) cleaning cycles result in undesirable and unproductive off-line periods for the equipment. Therefore, regardless of the level of silica in the incoming raw feed water, operation of conventional evaporation processes without a scale control method such as preferential deposition seeded slurry, generally involves concentration of $SiO_2$ in the high solids stream to a level not appreciably in excess of 150 ppm of silica (as $SiO_2$). This requires that evaporator systems be operated at lowered concentration factors (recovery rates) to prevent silica concentration in the blowdown stream from exceeding solubility limits. Seeded slurry systems can be taken to concentration factors that surpass the solubility of silica but rely on seed management procedures and are still prone to scaling of the evaporator heat transfer surfaces.

It is commonly understood that the solubility of silica increases with increasing pH, and that silica is quite soluble in high pH aqueous solution. The increase in silica solubility is approximately proportional to the change in ionization as increased ionization results in the soluble silicate ion being the dominant species. The solubility is not directly proportional because even un-dissociated silica exhibits some solubility in aqueous solutions, typically up to about one hundred twenty (120) ppm to one hundred sixty (160) ppm, depending upon temperature and other factors. In comparison, it has been demonstrated that silica solubility at pH 11 is in excess of one thousand five hundred (1,500) ppm at ambient temperature; silica is increasingly soluble as temperature and/or pH increases.

Figure 2:
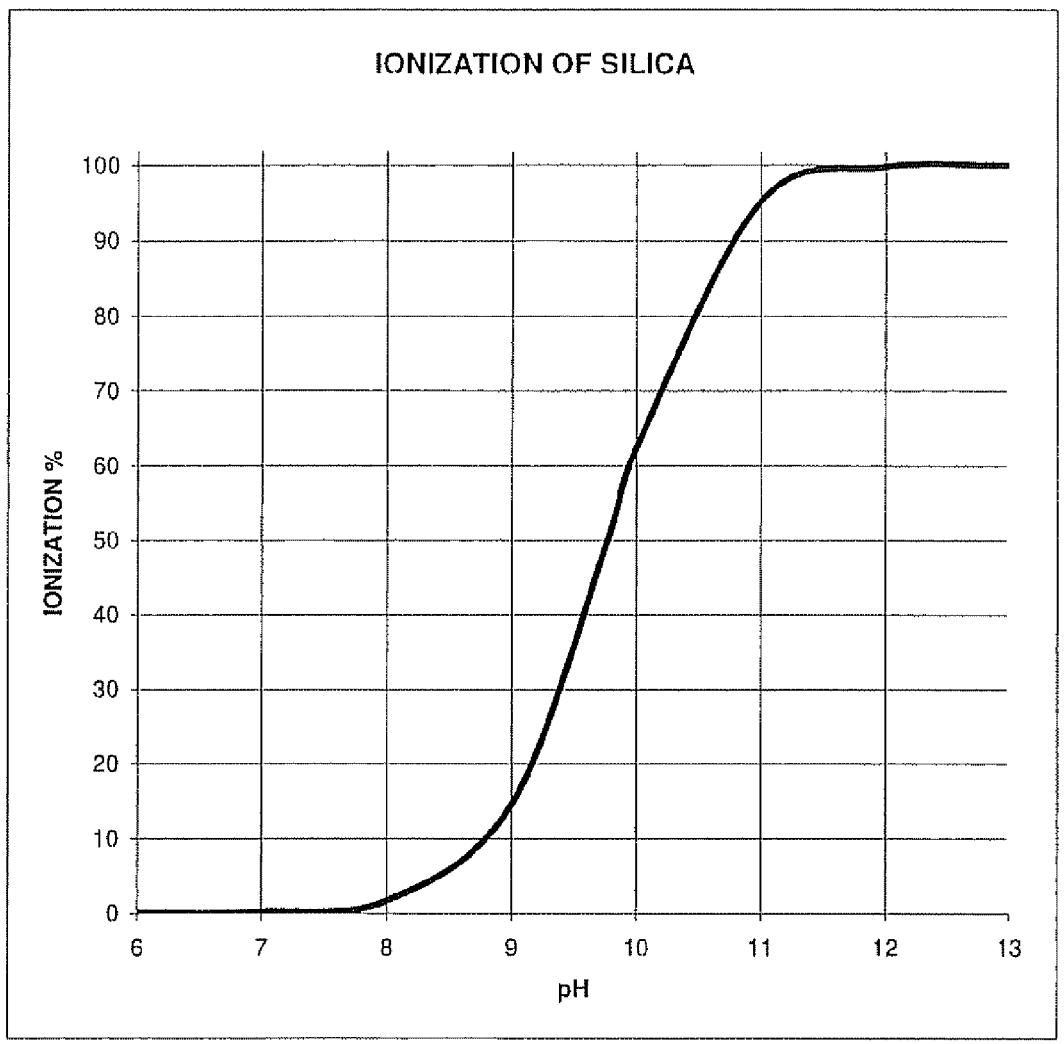
FIG. 2 details the ionization of silica as a function of pH.

Silica is very weakly ionized when in neutral or near neutral aqueous solutions and is generally considered to exist as un-dissociated (meta/ortho-) silicic acid ($H_4.SiO_4$) in most naturally occurring waters with a pH of up to about 8. The dissociation constant (pKa) value for the first stage of dissociation of silica has been reported at approximately 9.7, which indicates that silica is approximately fifty percent (50%) ionized at a pH of 9.7; the other fifty percent (50%) remains as un-dissociated (ortho) silicic acid at that pH. A graphical representation of the relationship between pH and the percent silica ionization is shown in FIG. 2. Clearly, it would be advantageous, where silica ionization is desired, to operate at a pH in excess of 10, and more preferably, in excess of 11, and yet more preferably, in excess of 12 where the entire silica molecule is present as a soluble silicate ion.

High pH evaporators typically operate at about 95-96% recovery which then leaves a highly concentrated stream amounting to 4-5% of the incoming feed that has to be disposed of. This stream which can be in excess of several hundred gallons per minute is then at a pH of 11-12 at temperatures of 80-90° C. and silica concentrations in excess of 5000 ppm.

Water treatment literature recommends the use of multi-valent salts such as magnesium, aluminum, and iron at a pH of 10-12 to remove silica. However, water produced in Tar Sands type formations in the process of generating high pressure steam for injection, is typified by a lack of these multi-valent ions as the pH has been raised to increase the solubility of silica in the concentrated brines.

The addition of precipitants such as those given above can be prohibitively expensive when one considers the high flow rates of these brine streams. An alternative way of removing the silica and neutralizing these streams to make them suitable for deep well injection was required.

Embodiments disclosed herein are based on the fortuitous discovery that silica can be reduced to a level of <100 ppm by the addition of concentrated acid and that at a pH of ~10.2, there is a massive polymerization that adheres to an inert substrate present in the reaction container. The inert substrate is alternately referred to as an "inert particle," which may be construed as a single particle or as a plurality of particles. The degree of silica removal is dependent on the temperature and the level of pH lowering required to reach silica levels that correspond to connate water requirements.

A series of experiments were conducted on waters typical of SAGD brines consisting of the ions and quantities shown in Table 1. This analysis, as mixed, was soluble at room temperature.

TABLE 1

| ION | Amount as PPM |
|---|---|
| Silica as $SiO_2$ | 5,000 |
| Sulfate as $SO_4$ | 475 |
| Boron as B | 605 |
| Carbonate as $CO_3$ | 9,825 |
| Chloride as Cl | 56,530 |
| Sodium as Na | 43,710 |
| TDS | 115,145 |
| pH | 11.7 @20.8° C. |

The tests focused on the effects of:
1. pH lowering;
2. Temperature reduction, and
3. Inert substrate material for the determination of silica deionization and subsequent solubility in brines that are suitable for mixing with deep well connate waters.

A number of samples were tested to determine the effect of the following parameters on the removal of silica from brines.

Referencing the following tables, all experiments were carried out in the following sequence of steps.

Suitable aliquots of the base sample brine were placed in the reaction vessel either heated or at room temperature as indicated 1. An inert substrate was added based on 2% of the total solution weight and the solution was sufficiently agitated with a magnetic mixer to keep the inert particles in suspension
2. Concentrated acid was added as indicated to attain the target pH
3. Agitated contact time was held at thirty (30) minutes
4. An aliquot of supernatant was withdrawn for centrifuging to determine soluble silica in the centrate
5. Natural settling time was varied between fifteen (15) minutes and one (1) hour and the supernatant analyzed for soluble silica. Settling times were varied to minimize turbidity resulting from suspended colloidal silica.

Example 1

The first set of tests were performed at room temperature using $CaSO_4 \cdot 2 H_2O$ (gypsum) at 2%, by weight, and a pH of 9. The results are shown in Table 2.

TABLE 2

70-75° F. and pH 9

| Test | Acid | Temp | Centrate % Red. | Super % Red. | pH |
| --- | --- | --- | --- | --- | --- |
| 1 | $H_2SO_4$ | 75 | 99.52% | 99.66% | 8.9 |
| 3 | $H_2SO_4$ | 73 | 99.92% | 99.98% | 9 |
| 4 | $H_2SO_4$ | 75 | 99.02% | 99.52% | 8.9 |
| 5 | HCl | 71 | 99.90% | 99.98% | 9 |
| 6 | $H_2SO_4$ | 75 |  | 99.48% | 9 |
|  |  | Average | 99.59% | 99.72% |  |

The results clearly indicate that the addition of a strong acid after an inert substrate has been mixed with the water produces a significant reduction in dissolved silica content. Centrate samples were clear water indicating that a centrifugal action is sufficient to remove even small particles. The supernatant samples showed a moderate amount of turbidity from free colloidal silica particles.

A further set of tests were conducted under the same conditions as Table 2 except that the pH was lowered to 7. The results are shown in Table 3.

TABLE 3

70-75° F. and pH 7

| Test | Acid | Temp | Centrate % Red. | Super % Red. | pH |
| --- | --- | --- | --- | --- | --- |
| 2 | $H_2SO_4$ | 74 | 99.50% | 99.36% | 6.8 |
| 13 | HCl | 72 | 99.86% | 99.82% | 7 |
|  |  | Average | 99.68% | 99.59% |  |

The results, when compared to Table 2, indicate that pH has a minimal effect when the process is carried out at 70-75° F. The foregoing results also indicate that the choice of acid to be used has no effect on the silica reduction.

Another set of experiments were carried out at the same conditions previously noted with the exception that the reaction temperature was raised to 180-190° F. to simulate hot brine. The results of the experiments are set out in Table 4.

TABLE 4

180-190° F. and pH 9

| Test | Acid | Temp | Centrate % Red. | Super % Red. | pH |
| --- | --- | --- | --- | --- | --- |
| 7 | $H_2SO_4$ | 182 | 91.54% | 90.84% | 8.9 |
| 9 | $H_2SO_4$ | 182 | 95.24% | 89.70% | 8.9 |
| 10 | $H_2SO_4$ | 182 | 92.24% | 90.66% | 8.9 |
| 11 | HCl | 182 | 95.84% | 91.04% | 8.9 |
| 12 | $H_2SO_4$ | 187 | 93.14% | 96.30% | 8.9 |
|  |  | Average | 93.60% | 91.71% |  |

The dissolved silica reduction of the brine is less than when operating the process at lower temperatures as shown in Table 4 when the pH is held at 9. It was also seen that the silica laden inert particles settled faster than the low temperature trials but the turbidity, as suspended silica, of the supernatant was higher in these tests.

The effect of a lower pH was then tested at elevated temperatures and the results are given in Table 5. There were two additional environment changes in this testing phase. Experiments 16 and 17 were carried out with a different inert seed material classified as diatomaceous earth, which is a mixture of calcined Soda Ash, Cristobalite, and Quartz. Experiments 15 and 16 were carried out with a 6%, by weight, inert seedbed of gypsum for test 15 and the diatomaceous earth material for test 16.

TABLE 5

180-190° F. and pH 7

| Test | Acid | Temp | Centrate % Red. | Super % Red. | pH |
| --- | --- | --- | --- | --- | --- |
| 8 | $H_2SO_4$ | 186 | 98.92% | 97.52% | 6.8 |
| 14 | HCl | 182 | 96.54% | 97.34% | 6.7 |
| 15 | $H_2SO_4$ | 184 | 98.68% | 98.44% | 6.9 |
| 16 | $H_2SO_4$ | 184 | 98.90% | 99.88% | 6.8 |
| 17 | $H_2SO_4$ | 188 | 98.64% | 98.66% | 7 |
|  |  | Average | 98.34% | 98.37% |  |

The lower pH gave better results at elevated temperature, as set out in table 4, but not as good as seen when operating at lower temperatures as shown in table 3. Experiment 15, with a 6%, by weight gypsum seed bed, resulted in a clear supernatant with hardly any suspended solids in it. This indicates that a greater seed area for adsorption results in greater silica reduction. The reactions in Tests 16 and 17, although they produced good silica reduction, were violent enough to preclude it as a suitable inert particle for the process.

The results overall show that when the water is cooled from the operating brine temperature of 180-190° F. to ambient, or near ambient temperatures, that the effect of pH reduction below 9 is minimal. In contrast, if the brine is neutralized at near operating temperatures, then reducing the pH to 7 as demonstrated in Tables 4 and 5 maximizes silica reduction. Based on these experiments it can be seen that the brine at any given site can be neutralized to a specific need. Thus, costs for cooling equipment and acid consumption can be tailored to meet injectability requirements of any specific deep well connate water.

Example 2

Another series of tests were conducted to determine the effects of the inert seed particle on silica reduction results by neutralizing the brine without an inert seed present. The results are given in Table 6.

TABLE 6

Silica Precipitation without an Inert Substrate

| Test | Acid | Temp | Centrate % Red. | Super % Red. | pH |
|---|---|---|---|---|---|
| 1 | H2SO4 | 187 | 92.36% | 91.36% | 9 |
| 2 | H2SO4 | 183 | 97.50% | 97.02% | 7 |
| 3 | H2SO4 | 74 | 97.56% | 97.62% | 9 |
| 4 | H2SO4 | 79 | 98.66% | 99.34% | 7 |
|   |   | Average | 96.52% | 96.34% |   |

The results were very similar to results obtained with an inert seed at the temperatures and pH previously used proving the efficacy of the pH neutralization process. However, the amount of suspended silica particles in the different supernatants was substantially greater during this set of tests than seen in the preceding experiments. This set of tests is also representative of current attempts at various sites to lower the brine pH and remove silica from the brine stream utilizing a high agitation reactor. The polymerizing silica is broken up by the agitation and results in fine discrete particles that require coagulants and flocculants to increase particle size and allow removal by filtration.

Example 3

A further set of tests were run as a cross check utilizing chemical analysis projections based on the kinetics of the input chemistry and speciation of the ions using ion association models. The outputs of the program based on temperatures and pH are given in Table 7.

TABLE 7

Silica Precipitation using Ion Speciation

| Test | Acid | Temp | Silica % Red. | Super % Red. | pH |
|---|---|---|---|---|---|
|   | $H_2SO_4$ | 185 | 7.20% | NA | 9 |
|   | $H_2SO_4$ | 185 | 95.10% | NA | 7 |
|   | $H_2SO_4$ | 72 | 69.20% | NA | 9 |
|   | $H_2SO_4$ | 72 | 98.30% | NA | 7 |

The results of the analytical analysis show the soluble silica reduction that can be expected given the pH and temperature of the process. It can be seen that the end pH becomes the driving force for silica reduction and although the temperature effect enters the process, it is not at the extent seen when using an inert substrate for deposition. This is not an unexpected result, as a mathematical model cannot account for the polymerization effect on the water stream.

The experiments conducted were static in that they simulated batch operation. The obvious results indicate that the presence of an inert particle to provide a multitude of sites for deposition of the polymerizing silica provides a low silica content supernatant. This effect is pronounced when operating with a greater quantity of inert particles in the reaction vessel.

A dynamic system, one that is continually inputting fresh silica containing brine, is expected to perform even better. Discrete particles that escape the adsorption process will be caught up in the newly polymerizing silica gel and serve as a source of self replenishing inert particles to continue the process as solids are removed from the system. Recirculation of the inert particles in the reaction vessel back to the silica containing brine will serve to ensure that some amount of particles are always present in the brine and also allow the inert particles to amass enough density to allow simple filtration. The increased density/size will allow a high degree of dewatering compared to the prior process which attempts to filter out soft flocculated solids that tend to clog the filter media. Dewatering the solids to less than the 40% being experienced at various sites will result in a lowered cost of disposal.

Example 4

Figure 1:
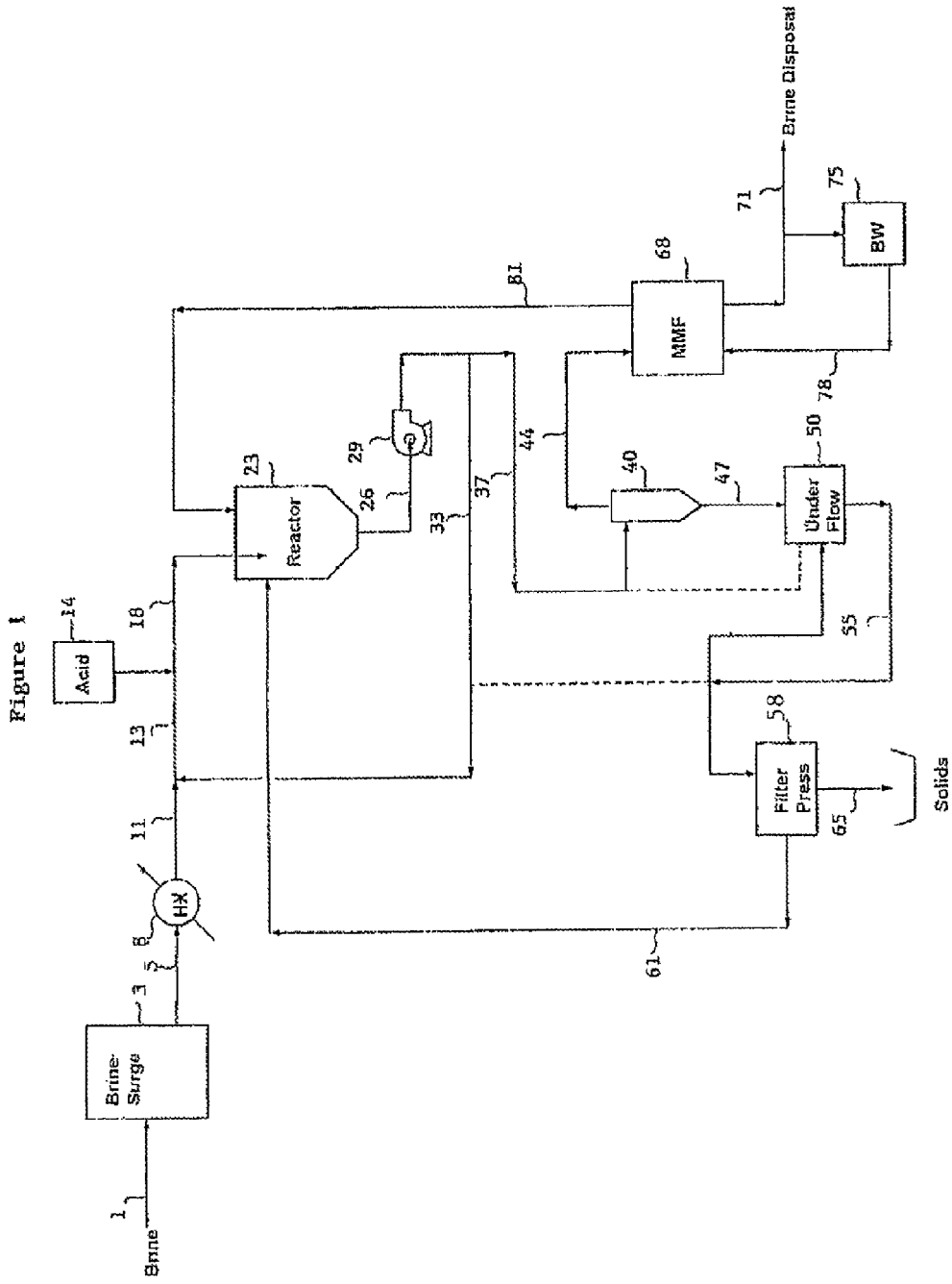
FIG. 1 is a flow diagram illustrating the brine neutralization and silica precipitation process in a typical embodiment in accordance with the present invention.

Example 4 describes preparation of water according to one embodiment are taught herein. Referring to FIG. 1, brine, typified by a high pH (9-13) and high dissolved silica ($SiO_2$) ranging from 500 ppm to 5000+ ppm, is stream 1. As is well known, brine may also include other inorganic salts along with possible organic compounds. There is also a minimal amount, or absence of, hardness, aluminum, and iron ions at the high pH these brines are controlled at.

Stream 1 at a temperature of 180-190° F. enters the brine surge tank 3 which is used as a temporary storage tank for the stream generating process to balance the flow to the brine neutralization system. The brine is then pumped via conduit 5 to heat exchanger 8 wherein it is cooled to the desired temperature with air or a cold process stream. The cooled brine exits the heat exchanger 8 via conduit 11 where it is merged with recirculating stream 33. The joined streams 13 now contain the brine and inert substrate particles known as suspended solids at a minimum 2%, by weight, and preferably 3-4%.

A concentrated acid such as sulfuric ($H_2SO_4$) or hydrochloric (HCl) is added from chemical system 14 preferably just prior to entering reactor vessel 23. The pH is rapidly lowered below 9 or, when required, to 7. The choice of final pH is dependent on the levels of dissolved silica permissible in the effluent wherein, a lower pH will provide a lower level of silica remaining in the stream. The rapid pH drop results in silica polymerization in which a gel-like structure is formed that adheres to the circulating crystals. Operation can be continuous or batch style.

The acidified brine and recirculating magma stream 18 then enters reactor vessel 23.

Reactor vessel 23 contains an agitated magma including low solubility or inert crystals at 3-4%, 3-6% by weight, 4-7% by weight, 5-8% by weight, or greater is maintained to keep the suspended solids in motion. Preferably the inert matter is a crystal of silica or gypsum ($CaSO_4.2\ H_2O$) or an equivalent which serves as a seed to start the deposition process.

Stream 18 mixes with the solution in reactor 23 and the polymerization process proceeds with a build-up of a gel-like structure that adheres to the circulating particles. The particles gradually grow in size and weight and then, by gravity, sink to lower depths in the reactor. Lighter particles that escape the agglomeration process onto a seed crystal serve as a seed source for newly incoming brine and the process becomes self sustaining in that as silica solids are removed from the system, new particles have already replaced them.

After a suitable reaction time in reactor 23, preferably about 0.5 hours, the neutralized brine exits via conduit 26 to recirculating pump 29. Pump 29 transfers the neutralized and suspended solids stream to the primary solids removal device 40 via conduit 37. A portion of stream 37 is separated and sent back to the beginning of the process via conduit 33 to join with incoming brine stream 11. Optionally, in the event the seed bed in reactor 23 builds up faster than it can be removed from primary solids removal device 40, a portion can be bypassed to the underflow containment vessel 50 for final solids removal in device 58.

The primary solids removal device 40 may be any of the standard solids removal treatment devices currently in industrial use. Preferably it is a centrifugal separation device such as a hydroclone, which is portrayed in FIG. 1, or centrifuge. If required or desired, a clarifier could be also be utilized.

The hydroclone operates by centrifugal force induced by a tangential entry of stream 37 into the separation chamber. Heavy solids flow to the inner walls of the hydroclone 40 and slide down to the underflow shown as stream 47. Suspended solids with a density close to water flow up the center of the hydroclone 40 and exit to stream 44 along with 80% of the incoming liquid stream. The remaining 20% of the incoming stream 37 departs with the heavy suspended solids into underflow 47. Flow orifices in hydroclone 40 are sized so as to maintain the underflow stream at about 30-35%, by weight, suspended solids Stream 47 flows to the underflow containment vessel 50 which serves to balance the flow through conduit 55. Conduit 55 transfers the underflow slurry in a recirculation loop back to containment vessel 50 whenever the final removal device 58 is not taking the slurry for solids separation. In the event that the seed level drops too low in reactor vessel 23, conduit 55 may also be used to transfer slurry back into recirculation loop 33.

Preferentially, final solids removal is accomplished in a filter press or, to those familiar with solids separation, alternatively, a movable belt filter press, which is a modification of a basic filter press. Another alternative would be a centrifuge but high maintenance and capital expense compared to a filter press necessitates a comparative benefits study to be accomplished.

The belt filter press 58 removes the solids by filtration through a porous media belt that can be supplied with different mesh sizes, ranging from roughly 80-micron down to ~30 micron. The final liquid removal from the forming cake is accomplished with air pressure and channeled through conduit 61 back to the reaction vessel 23. The solids cake comprising silica ($SiO_2$) seeds and about 40%, by weight, moisture can then be transported to a Class 2 landfill for disposal.

The low suspended solids centrate, or supernatant, from primary solids removal 40 is transferred via conduit 44 to the polishing solids removal device 68 either by hydraulic force from the centrifugal device or a pump if a clarifier was to be utilized in device 40.

Polishing solids removal device 68 may be any of the standard solids removal devices currently in use for polishing stream 44. The method chosen is dependent on the level to which any suspended solids need to be removed for disposal requirements and may include one or more of a microfiltration utilizing socks or diatomaceous earth, multi-media filtration, or even ultrafiltration. The back wash tank 75 is a storage reservoir for filtered water that can be used for backwashing or cleaning of any of the filtration devices. The water from reservoir 75 is pressurized and transported via conduit 78 to polishing solids removal device 68 where it travels counter-current to the filtration cycle and washes out any entrained particles. The wash water with entrained solids is then sent back to reactor 23 via conduit 81. Thus, if low solids removal efficiency is experienced in the primary solids removal device 40 they are captured and sent back to the process reactor. Optionally, and as required in the case of an upset, coagulant or polyelectrolyte can be pumped to the polishing solids removal device to assist in the filtration process.

Stream 71 is the final neutral pH, suspended solids free, and silica lowered water suitable for disposal by deep well.

It will thus be seen that certain changes may be made in carrying out the above method and in construction of a suitable apparatus in which to practice the method and in which to produce the desired product as set forth herein. It is to be understood that the invention may be embodied in other specific forms without departing from the spirit or essential characteristics thereof.

For example, while we have set forth exemplary designs for a process that neutralizes a high pH brine stream containing high levels of silica, other embodiments are also feasible to attain the result of the principles of the method disclosed herein. Therefore, it will be understood that the foregoing description of representative embodiments have been presented only for purposes of illustration and for providing an understanding of the invention, and it is not intended to be exhaustive or restrictive, or to limit the embodiments to the precise form disclosed. On the contrary, the intention is to cover all modifications, equivalents, and alternatives falling within the spirit and scope of the appended claims. As such, the claims are intended to cover the methods and structures described therein, and not only the equivalents or structural equivalents thereof, but also equivalent structures or methods. Thus, the scope of the invention, as indicated by the appended claims, is intended to include variations from the embodiments provided which are nevertheless described by the broad meaning and range properly afforded to the language of the claims, or to the equivalents thereof.

We claim:

1. A process for preparing an effluent stream for down-hole injection from a silica-containing brine, comprising:
   Cooling a silica-containing brine below 180° F.;
   adding an inert particle to said silica-containing brine, wherein the inert particle is mixed with the silica-containing brine in an amount of at least 2%, by weight, of the total weight of the brine;
   reducing the pH of the silica-containing brine to 9 or below;
   polymerizing and adsorbing said silica onto the inert particle; and
   removing the inert particle and adsorbed silica from the silica-containing brine, thereby creating a solution for down-hole injection.

2. The process of claim 1, wherein the pH of the silica-containing brine is reduced to below 7.

3. The process of claim 1, wherein the pH of the silica-containing brine is reduced by addition of concentrated acid.

4. The process of claim 3, wherein said concentrated acid is selected from the group consisting of sulfuric acid and hydrochloric acid.

5. The process of claim 1 comprising maintaining a reactor vessel a having a seed bed of inert particles of 3-6%, by weight for use during pH reduction and silica polymerization.

6. The process of claim 5, comprising agitating said reactor vessel sufficiently to maintain the inert seed bed in suspension.

7. The process of claim 5, comprising recirculating a portion of the reactor vessel contents back to the cooled silica-containing brine.

8. The process of claim 5, wherein the total time elapsed in the mixing, reducing, and adsorbing steps is about 0.5 hours.

9. The process of claim 1, wherein said inert particle is selected from the group consisting of gypsum and diatomaceous earth.

10. The process of claim 1, wherein the silica-containing brine has an initial silica concentration between 500 ppm and 10,000 ppm, and the solution for down-hole injection has a silica concentration below 400 ppm.

11. The process of claim 1, wherein the pH of the silica-containing brine prior to treatment is between 9 and 13.

12. A process for preparing a solution for down-hole injection from a silica-containing brine, comprising:
- mixing a silica-containing brine with an inert particle at a temperature below 180° F., wherein the inert particle is mixed with the silica-containing brine in an amount of at least 2%, by weight, of the total weight of the brine;
- reducing the pH of the silica-containing brine to 9 or below;
- polymerizing and adsorbing silica onto the inert particle; and
- separating adsorbed silica from the silica-containing brine in a first solids separation step, thereby separating said silica-containing brine into a supernatant and first separated solids;
- subjecting said supernatant to a second solids separation step, thereby separating said supernatant into second separated solids and a solution for down-hole injection.

13. The process of claim 12, further comprising subjecting said first separated solids to de-watering wherein a filtrate stream and a final separated solids stream are generated.

14. The process of claim 13, further comprising recycling said filtrate stream into said silica containing brine.

15. The process of claim 13, further comprising disposal of said final separated solids to a landfill site.

16. The process of claim 12, further comprising recycling said second separated solids into said silica-containing brine.

* * * * *